(12) United States Patent
Mozetic et al.

(10) Patent No.: US 8,247,039 B2
(45) Date of Patent: Aug. 21, 2012

(54) METHOD AND DEVICE FOR LOCAL FUNCTIONALIZATION OF POLYMER MATERIALS

(75) Inventors: Miran Mozetic, Ljubljana (SI); Alenka Vesel, Trzin (SI); Uros Cvelbar, Idrija (SI)

(73) Assignee: Institut "Jožef Stefan", Ljubljana (SI)

( * ) Notice: Subject to any disclaimer, the term of this patent is extended or adjusted under 35 U.S.C. 154(b) by 1092 days.

(21) Appl. No.: 11/916,167

(22) PCT Filed: May 16, 2006

(86) PCT No.: PCT/SI2006/000021
§ 371 (c)(1),
(2), (4) Date: Mar. 10, 2008

(87) PCT Pub. No.: WO2006/130122
PCT Pub. Date: Dec. 7, 2006

(65) Prior Publication Data
US 2010/0047532 A1   Feb. 25, 2010

(30) Foreign Application Priority Data
Jun. 2, 2005   (SI) .................................. 200500168

(51) Int. Cl.
*B05D 3/00* (2006.01)
*C23C 16/04* (2006.01)

(52) U.S. Cl. .................... 427/552; 427/555; 118/723 E; 428/195.1

(58) Field of Classification Search .................. 427/552, 427/488, 586, 596, 469, 569
See application file for complete search history.

(56) References Cited

U.S. PATENT DOCUMENTS

| | | | |
|---|---|---|---|
| 4,694,092 A | 9/1987 | Takahata et al. | |
| 4,845,132 A | 7/1989 | Masuoka et al. | |
| 5,124,173 A | 6/1992 | Uchiyama et al. | |
| 5,357,005 A | 10/1994 | Buchwalter et al. | |
| 5,369,012 A | 11/1994 | Koontz et al. | |
| 5,804,263 A * | 9/1998 | Goldberg et al. | 428/34.7 |
| 5,849,368 A | 12/1998 | Hostettler et al. | |
| 6,187,391 B1 | 2/2001 | Kataoka et al. | |
| 6,191,187 B1 | 2/2001 | Yamamura et al. | |
| 6,479,595 B1 | 11/2002 | Zhang et al. | |
| 7,223,534 B2 * | 5/2007 | Kaylor et al. | 435/5 |
| 2002/0025387 A1 | 2/2002 | Kuckertz et al. | |
| 2003/0040807 A1 | 2/2003 | Komvopoulos et al. | |
| 2003/0168157 A1 | 9/2003 | Kuenzel et al. | |
| 2003/0207099 A1 | 11/2003 | Gillmor et al. | |
| 2004/0168635 A1 | 9/2004 | Neuman et al. | |
| 2004/0213918 A1 | 10/2004 | Mikhael et al. | |
| 2005/0202173 A1 * | 9/2005 | Mills | 427/249.7 |

FOREIGN PATENT DOCUMENTS

| | | |
|---|---|---|
| CN | 1302707 | 7/2001 |
| DE | 19856227 A1 | 6/2000 |
| DE | 10204472 A1 | 9/2002 |
| EP | 1462183 A1 | 9/2004 |
| JP | 8109229 | 4/1996 |
| WO | 9812368 A1 | 3/1998 |
| WO | 9832789 A1 | 7/1998 |
| WO | 0134312 A1 | 5/2001 |
| WO | 0204083 A2 | 1/2002 |
| WO | 0246282 A1 | 6/2002 |
| WO | 02090112 A1 | 11/2002 |
| WO | 02103077 A1 | 12/2002 |
| WO | 03068846 A1 | 8/2003 |

OTHER PUBLICATIONS

International Search Report mailed on Oct. 6, 2006 in PCT/SI2006/00021.

* cited by examiner

*Primary Examiner* — Dah-Wei Yuan
*Assistant Examiner* — Jose Hernandez-Diaz
(74) *Attorney, Agent, or Firm* — Stanislav Antolin

(57) ABSTRACT

A method for the partial or total modification of functional groups on the surface of polymeric materials or polymer-containing materials, by means of combined plasma functionalization and localized thermal defunctionalization, is disclosed. At first, a surface of a polymer material is exposed to a cold plasma, whereby a desired polymer functionalization is achieved. After the plasma treatment, the surface is locally heated in an optional manner, primarily by means of an electron beam, resulting in local defunctionalization of the heated surface area. The directing of the electron beam across the surface of the material results in any desired distribution of functional groups on the surface. Also disclosed is a device for performing such a treatment.

7 Claims, 9 Drawing Sheets

US 8,247,039 B2

METHOD AND DEVICE FOR LOCAL FUNCTIONALIZATION OF POLYMER MATERIALS

This application is a national stage application under 35 U.S.C. 371 of international application No. PCT/SI2006/000021 filed May 16, 2006, published Dec. 7, 2006 as WO 2006/130122 A1, and claiming priority to Slovenian Application No. P-200500168 filed Jun. 2, 2005, the disclosures of which are expressly incorporated herein by reference.

BACKGROUND

1. Field of the Invention

An embodiment, including related aspects, of the present invention relates to a method for the partial or total modification of functional groups on the surface of polymeric or polymer-containing materials, by means of combined plasma functionalization and localized thermal defunctionalization. In an aspect at first, a surface of a material is exposed to cold plasma, whereby a desired polymer functionalization is achieved. After the plasma-treatment, the surface is locally heated in an optional manner, primarily by means of an electron beam, resulting in the local defunctionalization of the heated area. By directing the electron beam across the surface of the material, any desired distribution of functional groups can be obtained on the surface. Another embodiment, including related aspects, of the present invention relates to a device enabling the performance of such a treatment.

2. Presentation of the Problem

Polymeric or polymer-containing materials (in the following text: polymer material) exhibit surface properties determined by the polymer type. It is oftentimes desirable to modify the surface properties of a polymer material. The modification of surface properties is desirable, especially owing to the need for biocompatibility of the materials (with various implants, prostheses, and for the culture of biological cells and fibrils), or the need to improve the adhesion of various coating materials on a polymer surface. Normally, the surface of a polymer material has to be activated to enhance its wettability and surface energy, respectively, for example prior to metallization, printing, or dyeing. Or otherwise, it may be activated to provide favorable conditions for the growth of biological tissues on a polymer material. A polymer surface can be activated by an attachment of various polar functional groups thereto. If passivation of a surface is desired (e.g., reduction of wettability or surface energy, respectively, for example to render textiles hydrophobic or to inhibit the propagation of microorganisms on biocompatible materials), a thin layer of non-polar functional groups may be applied to a surface. The application of functional groups is termed functionalization of a polymer material. Functionalization may be achieved by various treatments, primarily by exposure of a polymer material to a cold plasma. In the case of activation, oxygen or nitrogen containing plasma is often used. In the case of passivation, fluorine and chlorine are chosen. Such treatments enable achieving a wide range of polymer wettability, from moderate hydrophilicity to significant hydrophobicity.

It is sometimes desirable to render one portion of a polymer material hydrophilic and another portion hydrophobic. In such cases, a polymer surface may be partially activated, and partially passivated. This condition is achievable by doping a portion of the polymer material surface during activation or passivation, respectively. In practice, such protection is feasible on relatively large surfaces. If, however, a conversion of functional groups is desired at the microscopic scale, the protection against the action of plasma is a very difficult task.

Functional groups on a polymer surface are not permanent, and their concentration diminishes with time. This phenomenon is termed defunctionalization. The defunctionalization rate is dependent on various factors, such as the type of materials, functional groups, functionalization, and the characteristics of the atmosphere in which the functionalized materials are kept, the optional exposure to light (especially ultraviolet), and various other irradiations. The defunctionalization rate usually increases with increasing temperature.

3. State of the Art

Activation by plasma treatment is oftentimes applied in medicine to activate various artificial implants made of polymeric materials. US2003207099 discloses a two-step method for the treatment of a polymer membrane, resulting in enhanced wettability and permeability of its surface. By a first surface treatment, the membrane surface is activated and becomes very hydrophilic, and a second treatment permanently stabilizes the activation. Similarly, U.S. Pat. No. 5,369,012 discloses the modification of a hydrophobic surface into a hydrophilic surface by exposing the membrane to an oxygen-plasma. WO0204083 discloses a method for the modification of hydrophobic surface properties of a polymer membrane into hydrophilic properties by exposing the membrane to a plasma.

Plasma-assisted surface modification of polymers for medical devices, such as artificial joints, is also used to enhance the surface resistance against detrimental processes, which cause the disintegration of the polymer surface into particles. Such particles may lead to inflammation of the tissues, and pain. US20030040807 discloses a plasma-assisted treatment of medical devices, resulting in the crosslinking of a polymeric material, which becomes more resistant. Simultaneously, the durability of the medical devices and the hydrophilicity of their surface are enhanced, making them more biocompatible. Similarly, WO0134312 discloses a surface treatment of polymeric materials used in medicine. The method comprises a plasma treatment of a material leading to various advantageous effects dependent on the gas, and treatment conditions. Such effects comprise a crosslinking of the polymer, which enhances its resistance, and its surface hydrophilicity or hydrophobicity, respectively.

EP1462183 discloses a method for a surface treatment of substrates, causing a crosslinking of the polymer by plasma treatment, followed by surface activation.

U.S. Pat. No. 5,849,368 discloses a method for hydrophilicization of a hydrophobic surface by dual plasma-treatment. A first treatment is performed in oxygen-plasma, thereby rendering the surface more polar and activated. A second treatment is performed in nitrogen-plasma, to generate amino groups on the surface, thereby enhancing the adhesion of the surface and a smooth layer, which is subsequently applied to the surface, and serves to reduce the friction of the device in the body.

WO02090112 discloses a method of bonding two polymer materials without an adhesive. The surface of one material is activated by a plasma or a laser beam, and placed in contact with an equally activated surface of another material. The joined materials are subjected to high pressure and temperature, thereby bonding the materials.

U.S. Pat. No. 6,479,595 discloses a method of high-pressure plasma treatment of hydrophobic polymer materials in order to render them hydrophilic, for increased dyeability of the surface with water-based dyes. JP8109229 discloses a method of activating the surface of polyvinyl materials for increasing the dyeability of the materials. DE10204472 discloses a method of treating a polymer material surface to be printed, which comprises a first step of making the surface hydrophilic by plasma treatment, and a second step of making the upper layer hydrophobic by laser treatment.

Numerous patents relate to the theme of subjecting non-polymeric materials to a plasma treatment. U.S. Pat. No. 6,187,391 discloses a method for plasma treatment of a textile fabric, which comprises coating a sizing agent inactive to plasma on one surface of the textile, and subjecting the other side to a cold plasma, to form active sites for the polymerization of the monomers. In clothing made of such textiles, sweat can easily be shifted from one surface to another thereof, and can be evaporated.

WO0246282 discloses a method of plasma treatment of porous materials, whereby they become hydrophilic. US20040213918 discloses a method for the functionalization of porous materials. A functionalizing monomer is deposited on their surface by means of vacuum vapor-deposition (VVD). The resulting polymer improves the adherence and durability of metallic and ceramic coatings on the surface of the materials. WO9832789 discloses a method for the functionalization of porous materials throughout the surface, including the surfaces of the pores. Thus, the surface becomes hydrophilic. U.S. Pat. No. 4,694,092 discloses a process for performing plasma treatment on a porous silica gel, whereby its surface becomes hydrophilic, and its pores remain hydrophobic.

U.S. Pat. No. 4,845,132 discloses a method for the modification of a hydrophobic porous membrane by plasma irradiation. Graft chains of a hydrophilic monomer are formed on a surface.

WO9812368 discloses a method for plasma treatment of carbon fibrils or fibril structures, respectively, to modify their surface properties.

U.S. Pat. No. 5,124,173 discloses a method of plasma surface treatment of plastics, by means of argon, helium, and/or ketones. The surface is modified to become hydrophilic, whereby its resistance is enhanced.

CN13027067 discloses a method for the activation of powder particles during the sintering process, resulting in an activation of the produced sintered materials.

U.S. Pat. No. 5,357,005 discloses a method for the activation of dielectric polymers applicable in electronics, by means of a treatment with water vapor plasma. The chemical and physical properties of a surface are modified, whereby its adhesion is enhanced.

U.S. Pat. No. 5,804,263 discloses a method for the treatment of hydrophobic materials having metallic, ceramic, or glass surfaces. The surface is first plasma activated, then exposed to unsaturated monomers, and to gamma-irradiation or electron beam irradiation, which induces polymerization of the monomers and a formation of a hydrophilic coating on the surface. US2002025387 discloses a process for the plasma activation of metallic materials having a web form. US20030168157 discloses a method for the treatment of fluoropolymer tubes to enhance their adhesive properties, wherein plasma activation is used as an intermediate step, prior to applying various polymers to the substrate. The activation is achieved by exposure of the sample to a gas plasma discharge, chemical baths, or an excimer laser, and combinations thereof. Similarly, DE19856227 discloses a method for the plasma activation of fluoropolymers prior to applying a layer of different polymers thereto.

WO03068846 discloses a method for modifying silicone rubber based substrates by plasma treatment. WO02103077 discloses a device for the activation of mobile substrates having a large surface.

All of the above enumerated methods for the modification and functionalization, respectively, of a material suffer from the following disadvantages that restrict their applicability: the modification and functionalization are not localized. The methods described in the above enumerated references do not impart a site-dependent modification to a material. The above art deals with methods for the functionalization by means of chemicals or plasma, whereby the total surface of a material always is modified. Such methods allow localized functionalization only with appropriate doping, which is not easily achieved in practice.

SUMMARY

Embodiments, including related aspects, of the present invention solve the problem of providing localized functionalization. A sequence of two procedures—e.g., a plasma functionalization and a thermal defunctionalization such as by an electron beam, yields virtually any desired distribution of functional groups on the surface of a workpiece. It may be widely used in all applications, which require a partially activated and partially passivated surface. Examples of such requirements are biological and medical materials—various substrates for the growth of biological tissues, and metal prostheses and implants.

An embodiment of the present invention relates to a method for achieving any desired distribution of functional groups at the surface of polymer materials. The method comprises the steps of: placing a workpiece made of a polymer material into a vacuum chamber of a system; exhausting the chamber; flowing a reactive gas into the system, generating cold plasma in the chamber containing the workpiece; re-exhausting the system; subjecting the workpiece to localized thermal treatment; exposing the chamber to atmospheric pressure; and removing the workpiece from the chamber.

A vacuum chamber for the treatment of an article made of one or more polymer materials is constructed in a manner enabling the generation of cold plasma therein. The generation of cold plasma is achievable by any type of gas discharge, in an aspect of an embodiment of the present invention by a discharge enabling the generation of cold plasma having a high radical concentration. Another aspect of an embodiment of the present invention relates to a high-frequency electrodeless discharge and a utilization of an inductively-coupled radiofrequency generator having a frequency within the range of from about 1 to about 50 MHz.

In a next step, the vacuum chamber is exhausted until the final pressure is reached, which in an aspect of an embodiment is lower than about 100 Pa, in another aspect of an embodiment is lower than about 10 Pa.

In a next step, reactive gas is flowed into the vacuum chamber. Dependent on the type of functionalization, various gases and combinations thereof may be exploited. In an aspect relating to a functionalization by means of non-polar groups, fluorine, or chlorine containing gases, or their mixtures with noble gases may be used. In another aspect relating to a functionalization by means of polar groups, oxidizing gases, such as oxygen, hydrogen peroxide, water vapor, carbon monoxide, as well as nitrogen or ammonia may be used. Likewise, mixtures of gases and mixtures with noble gases may be used. The plasma may be generated in a gas by means of a gas discharge. Radicals generated in the plasma can reach an article surface and result in chemical and physical modifications. A part of these modifications can lead to the functionalization of the surface: for example functional groups are attached to the surface, which functional groups may be polar or non-polar depending on the gas composition in the discharge.

When plasma functionalization is terminated, the discharge is switched off and the system is re-exhausted, until the final pressure is reached, which in an aspect of an embodiment is lower than about 100 Pa, in another aspect of an embodiment is lower than about 0.01 Pa.

A next step is a local thermal treatment of the article. The article may be heated in different ways, for example by a light beam, an ion beam, or by contacting the article with a heated needle or a similar object. Each method has its advantages as well as disadvantages.

Laser light can be partially absorbed at a polymer material surface, which can lead to a local increase of the temperature of a material. Functional groups on a polymer material surface can have a poor thermal resistance. A temperature increase at the location of a material at which a laser light is directed, can cause a decomposition of functional groups. The decomposition rate of functional groups depends on the type of the groups and the local temperature at the polymer material surface. The temperature is, however, dependent on a duration and an intensity of laser treatment. A complete defunctionalization of a portion of a polymer material surface can be achieved by means of a long-time or intensive treatment; a partial defunctionalization, however, is achieved by means of a short-time or mild treatment. A disadvantage of laser treatment can be that different polymers absorb laser light of different wave lengths differently. A low absorption may be neutralized to some extent by increasing the light beam intensity, which, however, causes the loss of localized heating, and thus renders blurry the border between the functionalized and defunctionalized regions of the surface. From the absorption viewpoint, the choice of a short-wave laser is indicated. However, the energy photons of such lasers cause a non-selective cleaving of the polymer chemical bonds, with consecutive loss of control over the defunctionalization process.

An ion beam treatment also can lead to a local heating of a polymer, but the process is limited by ballistic effects. Energized ions can collide with the atoms in the polymer surface layer, which can result in knocking out atoms from their original positions in the solid, and the consecutive significant modification of the chemical and physical properties of the polymer. Thus, an ion beam treatment also leads to a loss of control over the defunctionalization process.

A local treatment of polymer materials by means of an electron beam can result in a local heating of an article surface as well. In this case, no difficulties with selective absorption are encountered (unlike with the case of laser treatment), since an absorption depth is shallow and substantially independent of the polymer type. In addition, electron absorption does not modify the chemical characteristics of the polymer, since it does not lead to bond cleaving (unlike with the case of laser treatment), or the knocking out of atoms (unlike with the case of ion-beam treatment).

Namely, an electron mass is an order of magnitude less than a mass of an atom in the solid. For this reason, the method of choice for functionalization is a localized electron-beam heating of an article surface.

By using a simple electron beam treatment, the functionalization of an area may be achieved, which area is approximately identical with a cross-section of a high-energy electron beam. A direction of the beam across the polymer material surface can yield any desired distribution of functional groups on the total workpiece surface. This can be especially important in the culture of organic tissue on a biocompatible medium, where the choice of the functional groups distribution enables to influence the initial growth form of the organic tissues.

In an aspect of an embodiment, localized thermal treatment may be achieved by the utilization of any source of high-energy electrons, while in another aspect of an embodiment, it may be achieved by an electron gun, which focuses the electron beam to an area smaller than approximately 0.5 mm. A characteristic electron kinetic energy may be of the order of about 1000 eV, and a characteristic power may be dependent on a displacement rate of the electron beam across the article surface. By means of an electron beam, a polymer surface may be locally heated up to a temperature at which the characteristic defunctionalization time is less than about 1s. For a majority of polymer materials, this temperature is within the range of from about 100° C. to about 200° C.

A working example of an embodiment of the polymer material functionalization and selective defunctionalization methods is described below. It exemplifies a polymer film having a surface, which at first was activated by means of low-pressure oxygen-plasma treatment at a high oxygen atom concentration, and then deactivated by an electron beam. The invention is illustrated by the following drawings, which show:

DETAILED DESCRIPTION OF SOME EMBODIMENTS

Figure 1:
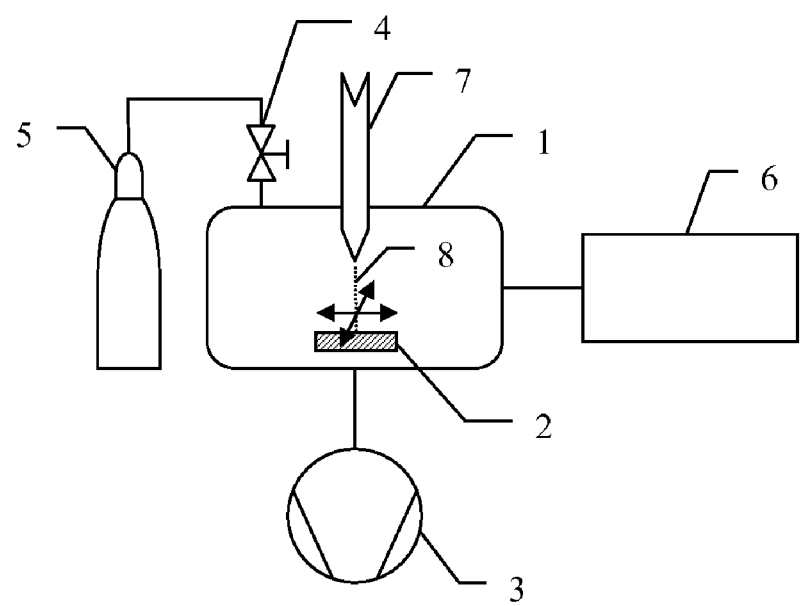
FIG. 1 is a schematic representation of the device for a local functionalization of polymer materials according to an aspect of an embodiment of the present invention.

FIG. 1 is a schematic representation of a device enabling the local functionalization of polymer materials according to an embodiment, including related aspects, of the present invention. The device comprises a vacuum chamber 1, a workpiece support 2, a vacuum pump 3, a dosing valve 4, a gas bottle 5, a plasma generator 6, and an electron gun 7, which is the source of a high-energy electron beam 8. The vacuum chamber 1 is constructed in such a manner that it enables an application of an electrodeless discharge. A workpiece to be locally functionalized can be fixed on a support 2, inside the chamber 1. The support 2 is made of a material that exhibits low reactivity with the plasma such as glass, ceramics, or a highly stable polymer such as Teflon. The vacuum chamber is exhausted by means of one or more pumps 3. Typically, pumps 3 are used, which yield a medium or high vacuum inside the chamber 1. During the polymer functionalization step, a gas is flowed from the gas bottle 5 through the dosing valve 4 into the chamber 1. Instead of one gas, several gases may be used simultaneously. Inside the vacuum chamber 1, during the functionalization step, plasma is generated by means of an inductively-coupled plasma generator 6. After the termination of functionalization, the vacuum chamber 1 is re-exhausted by means of a vacuum pump 3, until the final pressure is reached. The defunctionalization is achieved by an electron gun 7, which is the source of a high-energy electron beam 8. The polymer workpiece on the support 2 is locally heated by means of an electron beam. If a particular distribution of functional groups is desired on the surface of the polymer workpiece, which is fixed on the support, either the support 2 or the electron beam 8 may be moved.

Figure 2:
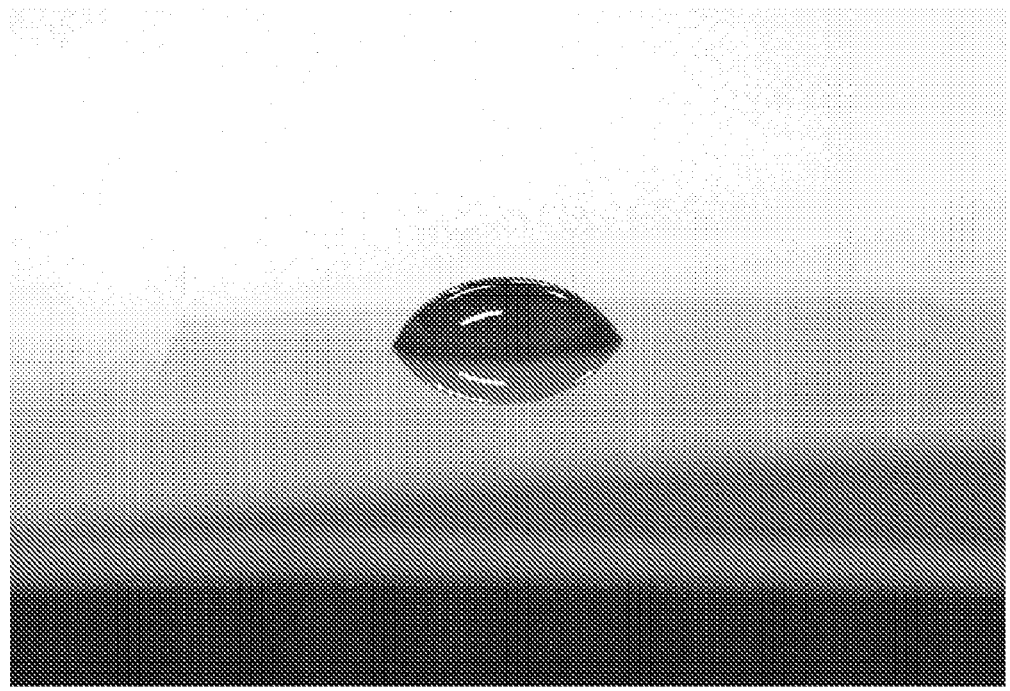
FIG. 2 is a photograph of a drop of deionized water on the surface of the untreated polymer film—side view.
Figure 3:
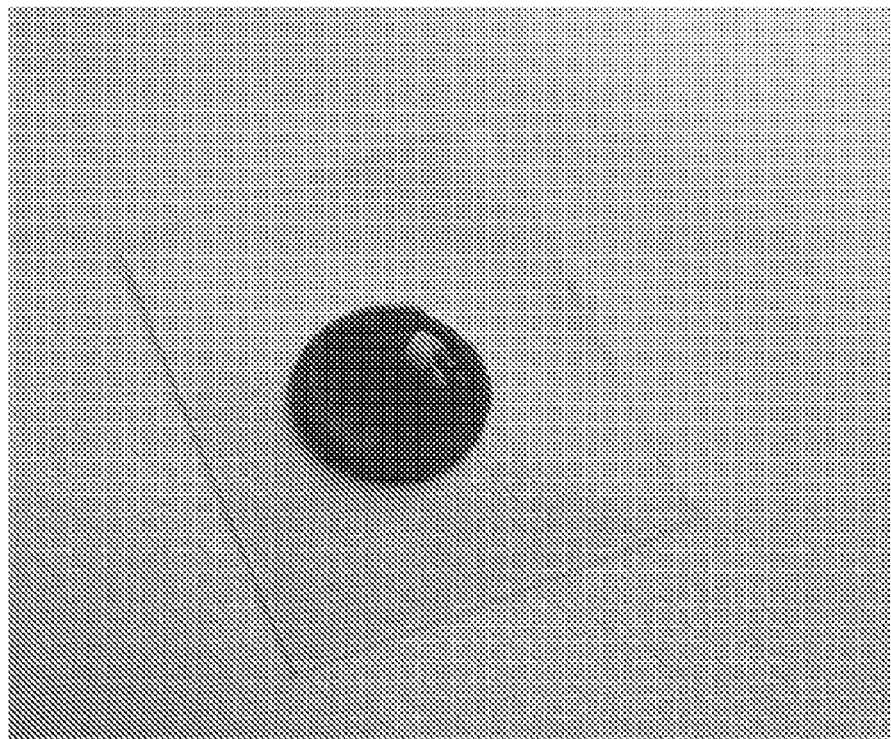
FIG. 3 is a photograph of a drop of deionized water on the surface of the untreated polymer film—top view.

FIGS. 2 and 3 represent photographs of a drop of deionized water on the surface of an untreated polymer film. Typically, the drop has a semi-spherical shape. The contact angle is about 55°, which is characteristic for a hydrophobic polymer surface.

Figure 4:
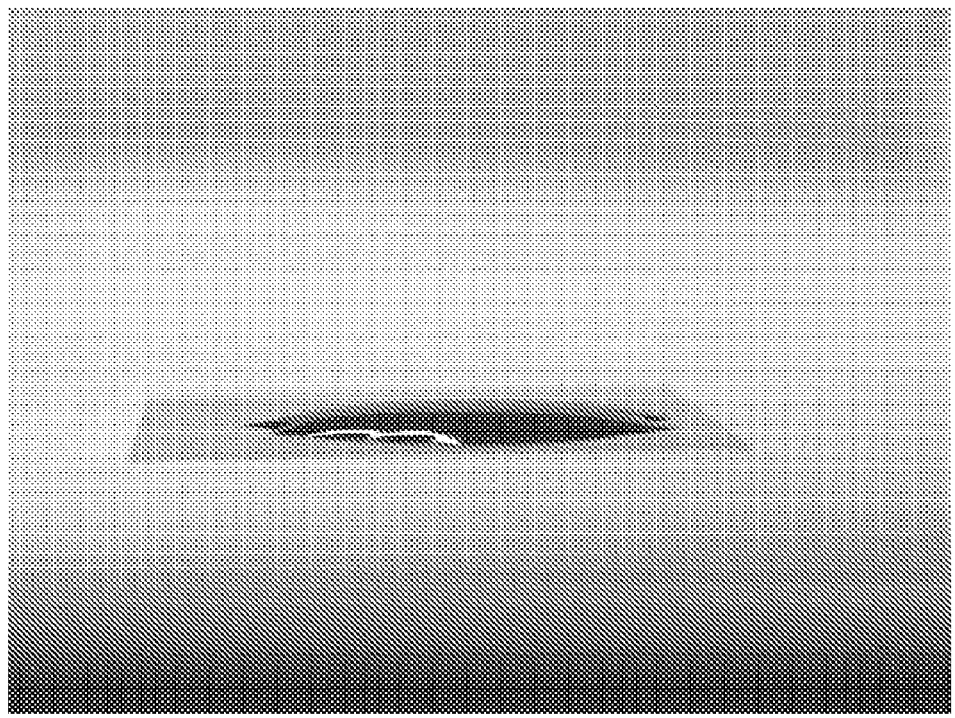
FIG. 4 is a photograph of a drop of deionized water on the surface of the plasma-treated polymer film—side view.
Figure 5:
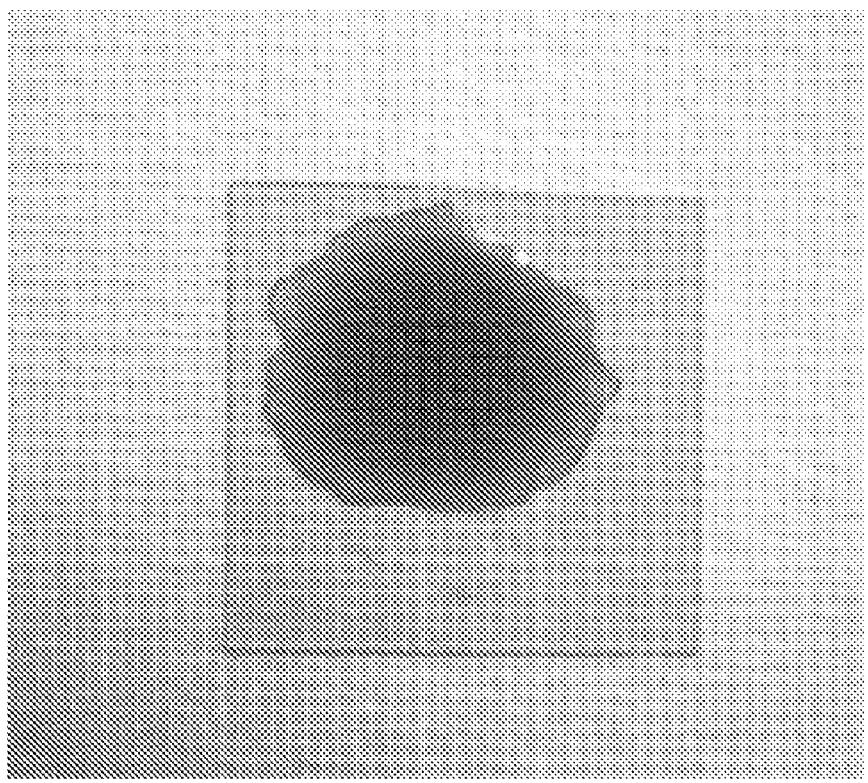
FIG. 5 is a photograph of a drop of deionized water on the surface of the plasma-treated polymer film—top view.

The polymer film was exposed to the action of oxygen plasma having an oxygen atom density of $2\times10^{21}$ $m^{-3}$ for 5 seconds. FIGS. 4 and 5 represent photographs of a drop of deionized water on the surface of a plasma treated polymer film. After the plasma treatment, the drop wets over a larger area, retaining, however, its approximately spherical shape. The contact angle is about 10°, which is characteristic for a highly activated (highly hydrophilic) polymer surface. Thus, the oxygen-plasma treatment renders the polymer film surface activated, owing to its functionalization with oxygen-rich polar groups.

Figure 6:
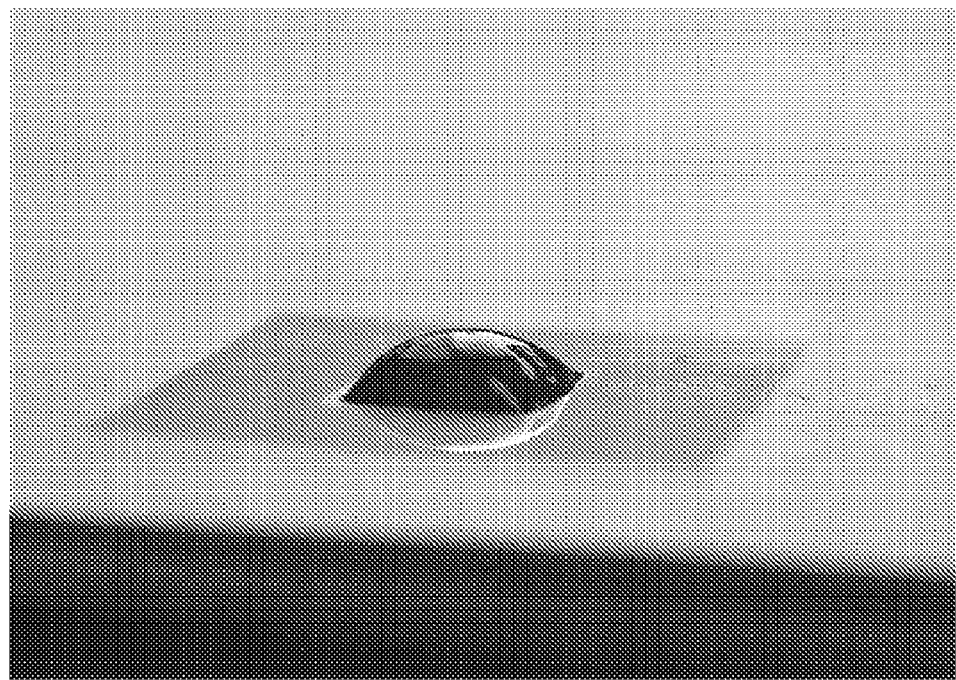
FIG. 6 a photograph of a drop of deionized water on the surface of a plasma-treated polymer film, which was subsequently treated by means of a square-shaped electron beam—side view.
Figure 7:
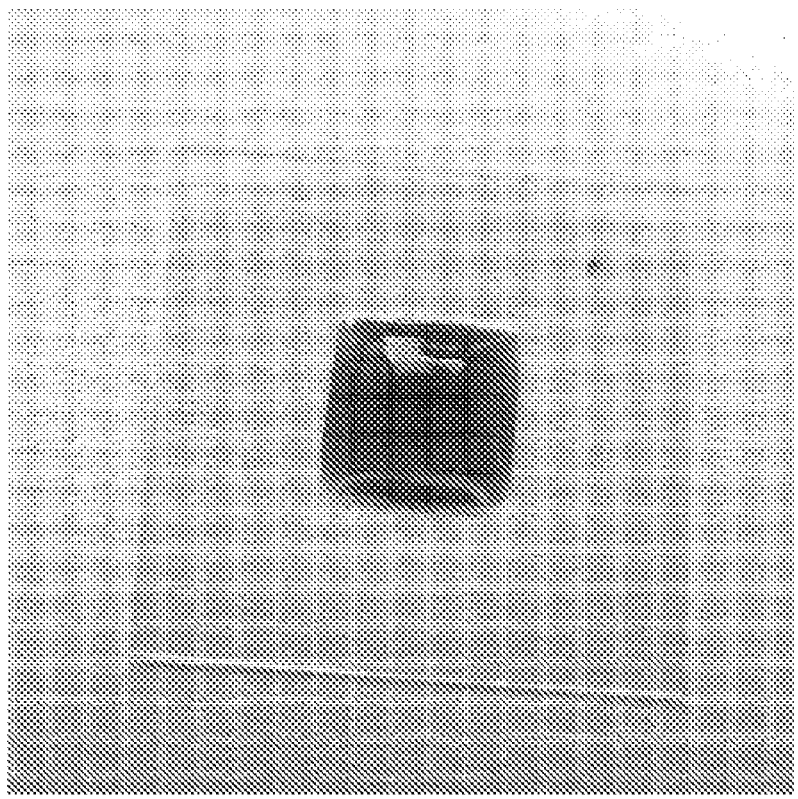
FIG. 7 is a photograph of a drop of deionized water on the surface of a plasma-treated polymer film, which was subsequently treated by means of a square-shaped electron beam—top view.

Subsequent to the plasma treatment, the polymer film was locally subjected to thermal treatment by means of an electron beam, which drew a square of about 5×5 mm on the surface. Inside the square, the film had not undergone thermal treatment. FIGS. 6 and 7 represent photographs of a drop of water on the treated polymer film, with defunctionalized regions, where the local temperature was increased by the electron beam. According to rough calculation, the film temperature reached about 160° C. at the electron beam treated surface. FIGS. 5 and 6 show clearly that the water drop is square-shaped. Such a shape is the result of a different distribution of polar functional groups on the polymer film surface. Inside the square, the concentration of polar groups is high and causes the deformation (wetting) of the drop. Since the square frames the area, in which the group concentration is low owing to the electron beam deactivation, the contact angle of the drop is large, and comparable with that of a non-activated surface (FIGS. 2 and 3).

Figure 8:
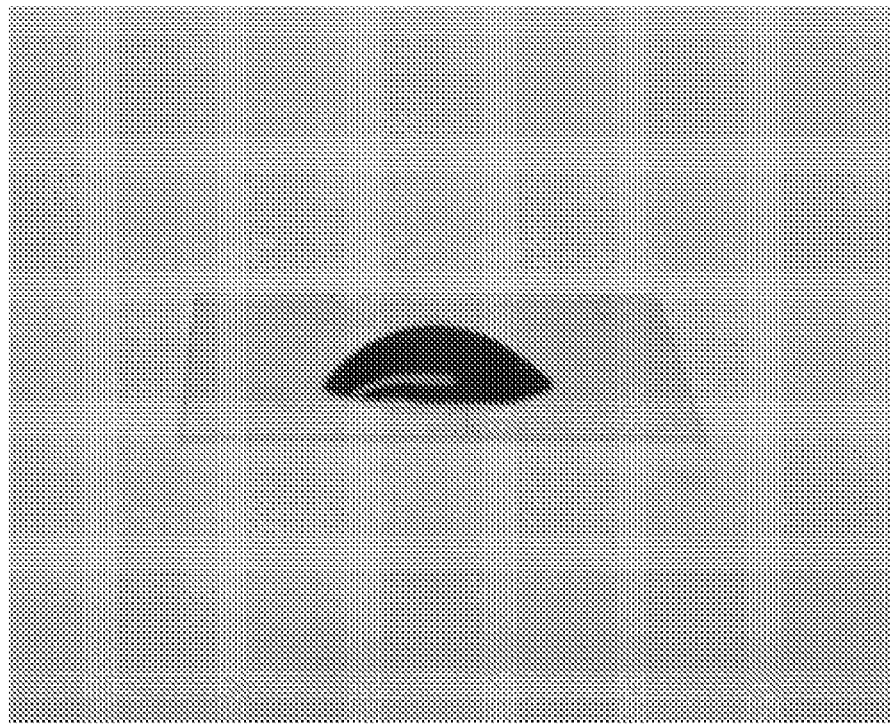
FIG. 8 is a photograph of a drop of deionized water on the surface of a plasma-treated polymer film, which was subsequently treated by means of a heart-shaped electron beam—side view.
Figure 9:
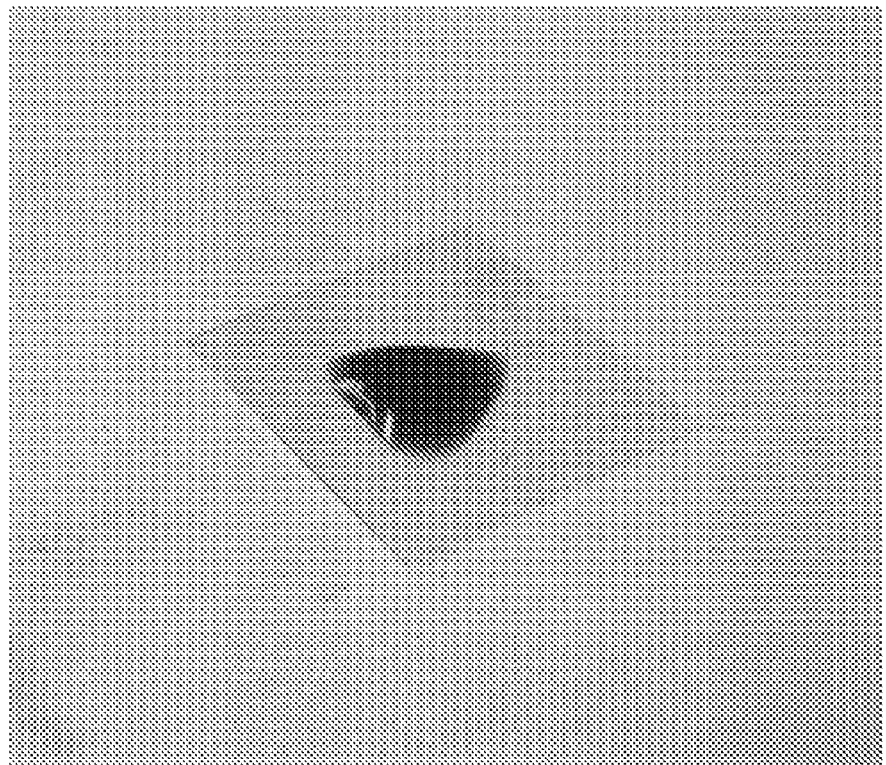
FIG. 9 is a photograph of a drop of deionized water on the surface of a plasma-treated polymer film, which was subsequently treated by means of a heart-shaped electron beam—top view.

The sequential treatment of the polymer film with plasma and an electron beam results in a locally modified concentration of the functional groups, as evident from the unusual shape of the water drop on the film surface. By directing the electron beam across the surface, virtually any desired distribution of functional groups may be achieved. FIGS. 8 and 9 represent a drop of water on the surface, where a heart-shaped figure was created by the electron beam.

The method according to an aspect of an embodiment of the present invention comprises placing a workpiece made of a polymeric material or a polymer-containing material into a vacuum system discharge chamber 1, exhausting air from the chamber by means of vacuum pumps 3, flowing a reactive gas into the chamber through a dosing valve 4, generating a cold plasma by means of a plasma generator 6, re-exhausting the system, and subjecting the workpiece surface to localized thermal treatment by means of an electron beam generated by an electron gun 7. The workpiece surface is locally heated by means of an electron beam up to a temperature at which the characteristic defunctionalization time is less than about 1s. The electron energy and power correspond to the method of treating the polymer articles. The electron source is focused on a surface of less than about 0.25 $mm^2$. The radical flux to the article surface is substantially uniform, and the received dose of the radicals according to an aspect of an embodiment is within the range of from about $10^{22}$ to $10^{26}$ radicals per square meter of the article surface, according to another aspect of an embodiment is within the range of from about $10^{23}$ to $10^{24}$ radicals per square meter of the article surface. Plasma having a radical density of at least about $10^{20}$ $m^{-3}$ is generated in the discharge chamber.

Another aspect of an embodiment, including related aspects, of the present invention relates to a device for performing the method for the local functionalization of polymer materials. Such device comprises a vacuum chamber 1, a workpiece support 2, a vacuum pump 3, a dosing valve 4, a gas bottle 5, an inductively-coupled plasma generator 6, and an electron gun 7, which is the source of a high-energy electron beam 8. The vacuum chamber 1 is constructed in such a manner that it enables an application of an electrodeless discharge, and the support 2 is made of a material that exhibits low-reactivity with the plasma such as glass, ceramics, or a highly stable polymer such as Teflon.

What is claimed is:

1. A method for the local functionalization of a polymer material, the method comprising the steps of:
    (a) placing a workpiece comprising a polymeric material or polymer-containing material into a chamber;
    (b) evacuating the chamber;
    (c) dosing a reactive gas into the chamber;
    (d) communicating a cold plasma with at least a portion of at least one surface of the workpiece;
    (e) re-evacuating the chamber; and
    (f) subjecting at least a portion of the at least a portion of the at least one surface of the workpiece to an electron beam so as to defunctionalize the at least a portion of the at least a portion of the at least one surface.

2. The method in accordance with claim 1, wherein the at least a portion of the at least a portion of the at least one surface is heated up to a temperature at which the characteristic defunctionalization time is less than about 1 s.

3. The method in accordance with claim 2, wherein an energy and a power of an electron source for the electron beam is capable of treating the polymer material.

4. The method in accordance with claim 1, wherein the electron beam is focused on a surface area of less than about 0.25 $mm^2$.

5. The method in accordance with claim 1, wherein the communication of the cold plasma with the at least a portion of the at least one surface of the workpiece comprises providing a substantially uniform radical flux to the at least a portion of the at least one surface and a received dose of the radicals comprises a range of from about $10^{22}$ to about $10^{26}$ radicals per square meter.

6. The method in accordance with claim 1, wherein the communicated plasma comprises a radical density of at least about $10^{20}$ $m^{-3}$.

7. The method in accordance with claim 5, wherein the received dose of the radicals comprises a range of from about $10^{23}$ to about $10^{24}$ radicals per square meter.

* * * * *

UNITED STATES PATENT AND TRADEMARK OFFICE
CERTIFICATE OF CORRECTION

PATENT NO. : 8,247,039 B2  
APPLICATION NO. : 11/916167  
DATED : August 21, 2012  
INVENTOR(S) : Miran Mozetic, Alenka Vesel and Uros Cvelbar Page 1 of 1

It is certified that error appears in the above-identified patent and that said Letters Patent is hereby corrected as shown below:

Column 6, line 11, the words "about Is.", should read --about 1 s.--.

Column 6, line 13, the words "100° C.", should read --100° C--.

Column 7, line 38, the words "160° C.", should read --160° C--.

Column 8, line 3, the words "about Is.", should read --about 1 s.--.

Signed and Sealed this  
Ninth Day of April, 2013

Teresa Stanek Rea  
*Acting Director of the United States Patent and Trademark Office*